V. G. APPLE.
POWER TRANSMITTING MECHANISM.
APPLICATION FILED MAR. 19, 1913.
1,116,970.
Patented Nov. 10, 1914.
3 SHEETS—SHEET 1.
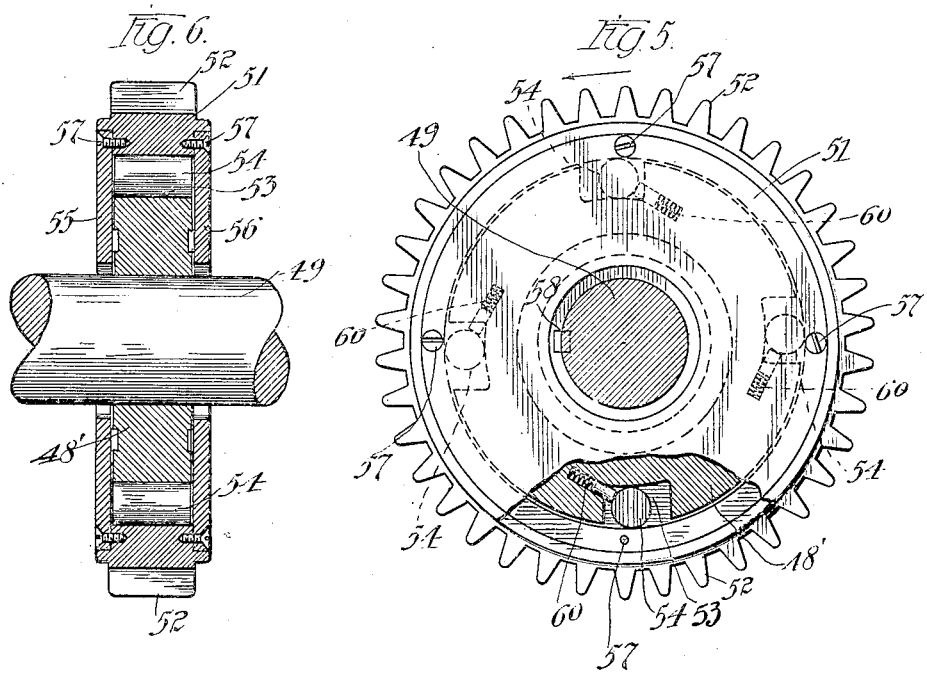
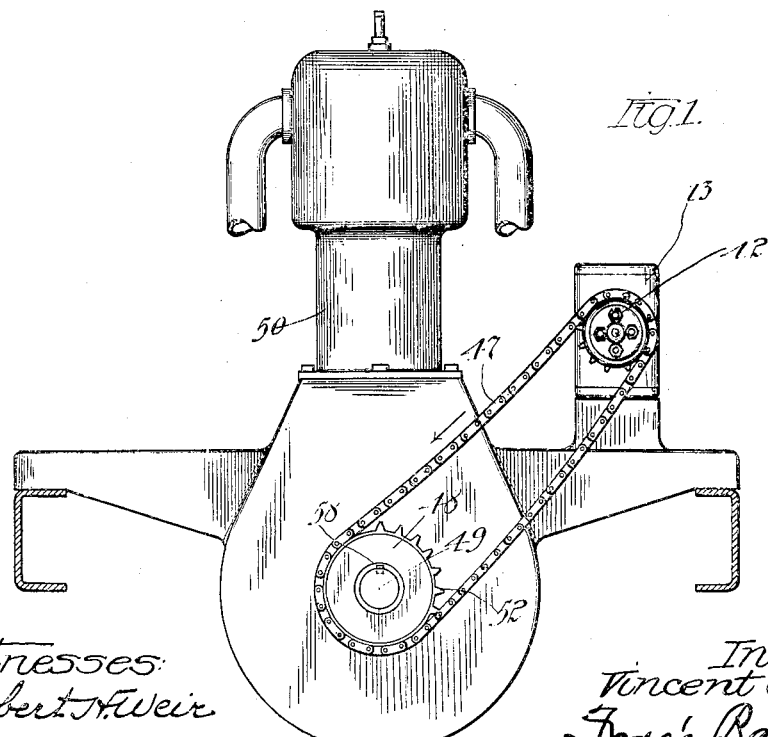
Witnesses
Robert H. Weir
Eugene Niederhofer
Inventor
Vincent G. Apple
Forée Bain May
(Attys)

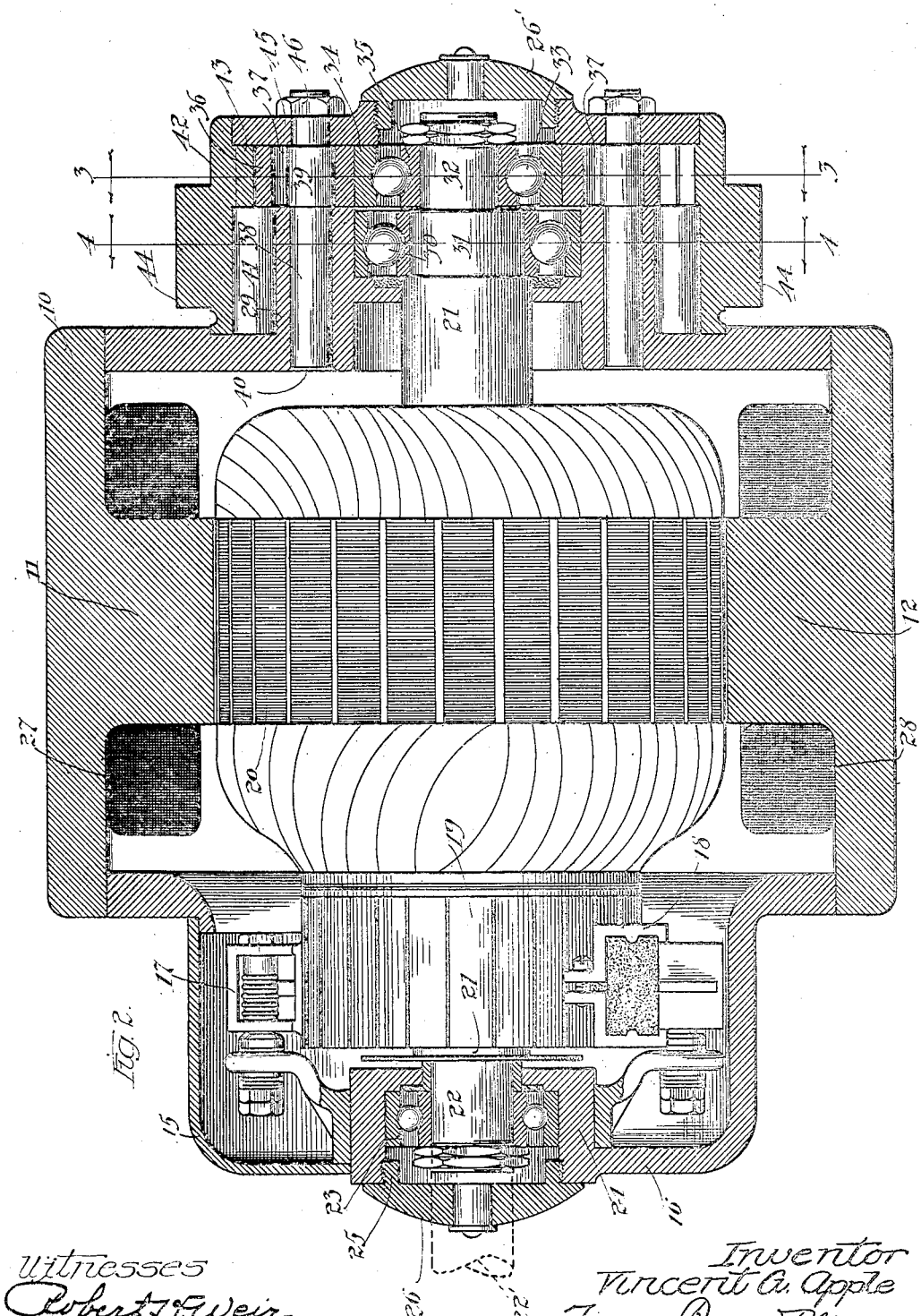

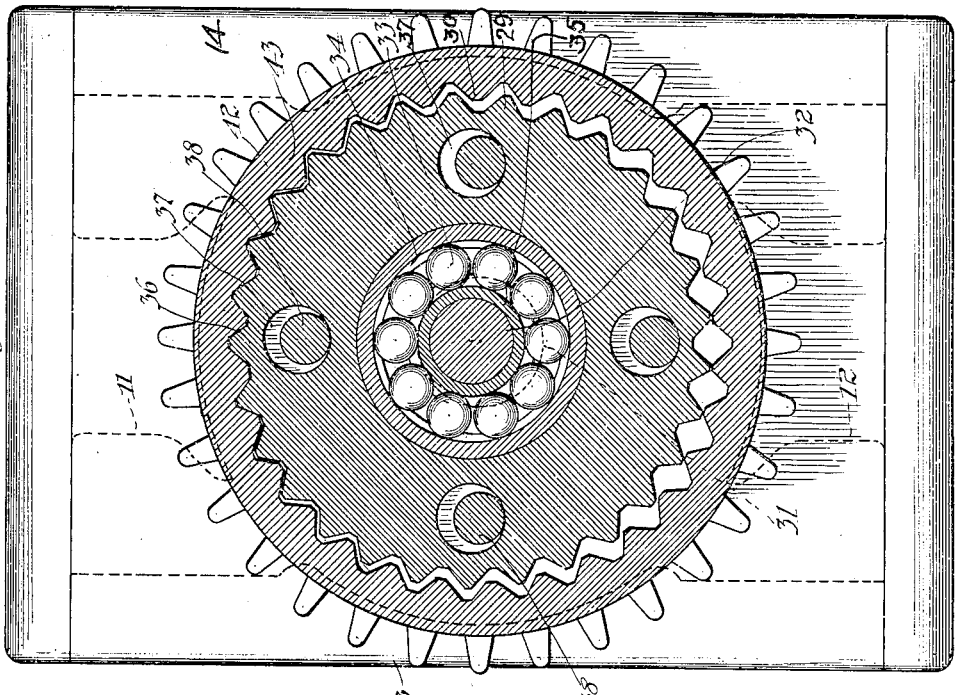
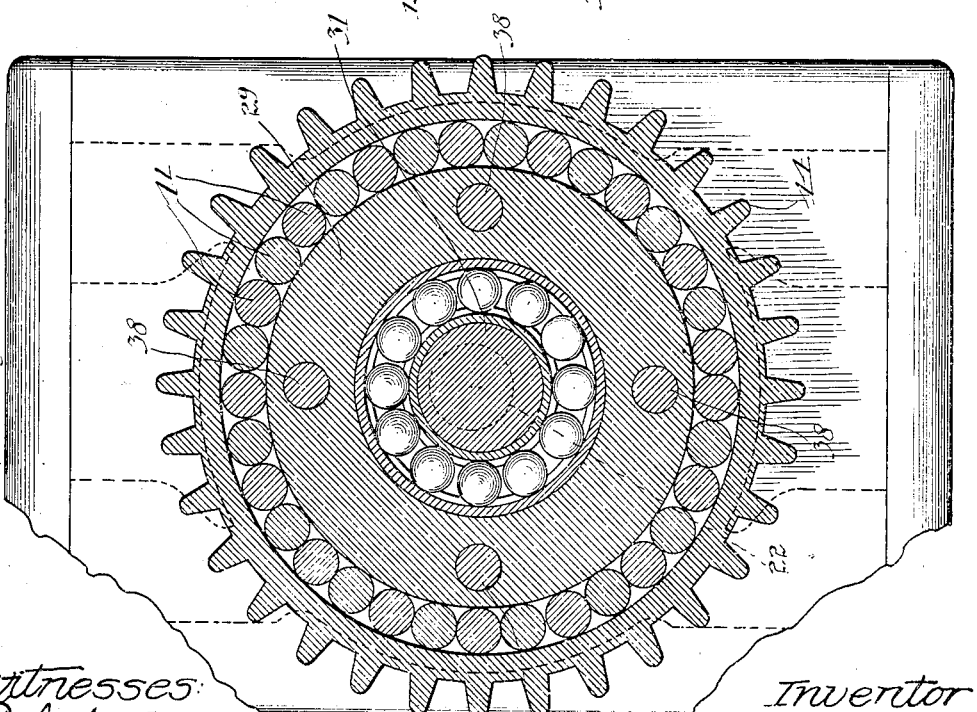

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

POWER-TRANSMITTING MECHANISM.

1,116,970. Specification of Letters Patent. Patented Nov. 10, 1914.

Application filed March 19, 1913. Serial No. 755,279.

*To all whom it may concern:*

Be it known that I, VINCENT G. APPLE, a citizen of the United States, residing at Dayton, in the county of Montgomery and State of Ohio, have invented certain new and useful Improvements in Power-Transmitting Mechanism, of which the following is a specification.

My invention relates to improvements in power transmitting mechanism.

The invention is applicable for electric motors and especially in association with internal combustion engines where the motor may be employed to start the engine and continued in service until said engine becomes self-propelling. In such instances, after the starting operation, the services of the motor being no longer required, any further rotation of the motor parts by the engine can serve no useful purpose, but to the contrary it is thereby subjected to unnecessary wear, and while uselessly continued in rotation it absorbs power that could otherwise efficiently be conserved.

One of the salient objects of my invention is to provide a transmitting mechanism that may be efficiently used in association with a rapidly rotating motor to slowly rotate the power shaft of an internal combustion engine whereby, when the engine becomes self-propelling and drives its own shaft at a faster speed than it is being rotated by the motor, the gearing relation is at this critical time automatically disconnected, and the engine will thereafter continue in operation at the higher speed and without driving the motor.

Other and further objects of my invention will become readily apparent to persons skilled in the art from a consideration of the following description when taken in conjunction with the drawings, wherein—

Figure 1 is an assembled view, showing the power transmitting device connecting a motor with an internal combustion engine; Fig. 2 is an enlarged longitudinal-central section showing an electric motor and parts of the reduction gear; Fig. 3 is a transverse section on line 3—3 of Fig. 2, looking in the direction of the arrows; Fig. 4 is a similar view on line 4—4 of Fig. 2; Fig. 5 is a front elevation of a clutching mechanism to be contained on the power shaft of the engine, showing parts broken away and in section; and Fig. 6 is a transverse central section of the clutch mechanism.

In all the views the same reference characters are employed to indicate similar parts.

The general form of the motor is, of course, immaterial, although I prefer to provide one having a housing that completely incloses and protects all of the working parts, as shown in Figs. 2, 3, and 4, wherein 10 is the magnetic frame of the field magnet having, in this particular exemplification, two field magnet poles 11 and 12 and two consequent poles 13 and 14, thereby providing a quadrupolar motor. The commutator end of the frame terminates in the commutator casing 16, having a removable panel 15 for access to the conducting brushes 17 and 18 of the commutator 19. An armature 20 rotates between the poles of the field magnet on the shaft 21. The commutator end 22 of the shaft is supported in the ball bearing 23. The ball bearing 23 is secured in the hollow hub 24, the outer end of which is screw threaded, as at 25, for securing the closing cap 26 in place. I have shown in dotted lines an extension 22' of the shaft 22 so that application of power to the motor, for the purpose of transmitting power from the motor, may be made thereto if desired, in which event the cap 26 must be perforated sufficiently to permit the passage of the extension 22' therethrough. The motor is provided with the usual field magnet windings 27 and 28.

Projecting from the driving end of the motor casing is a hollow annular hub 29, within which is carried a ball bearing 30 for the reduced end 31 of the armature shaft 21. The further outward extension 32 of the shaft 21 is eccentric to the axis of the main part of the shaft. This eccentric carries a ball bearing 33, one member 34 of which is secured in the floating spur-gear 36, the other member 35 being secured on the eccentric extension 32 of the shaft 21, so that when the shaft 21 is rotated the eccentric 32 imparts a universal radial motion to the spur-gear 36 in its own diametric plane. The spur gear 36 is perforated, as at 37, providing four equally spaced-apart apertures. These apertures or perforations are somewhat larger than the coöperating studs 38, and are adapted loosely to overlie the larger portions 39 of said studs. The studs 38 are equally spaced around the annular hollow hub 29, and pass through the said hub and are riveted, as at 40, on the inner side of the casing.

The outside surface of the hub 29 is turned true and smooth and concentric with the armature, for reception of rollers 41, upon which an annular driven geared member 42 is mounted, thereby to provide substantially frictionless bearings for said gear member 42.

The gear member 42 is provided on an annular part of its inner surface with internal gear teeth 43, of which there are thirty, of peculiar wedge shape, a portion of which teeth are constantly in mesh with similar radially projecting teeth on the spur-gear member 36, of which there are twenty-nine, in this particular exemplification.

The bodily universal displacement of the spur-gear 36 in radial directions in its own plane, by the rotation of the eccentric 32 rotatively displaces the driven gear member 42 a distance substantially equal to the tooth pitch at each revolution of the eccentric 32, thereby effecting considerable difference in the revolutions between the driving shaft 21 and the driven gear member 42; the shaft 21 being required to rotate thirty revolutions to accomplish one revolution of the gear member 42. The driven member 42 is provided with radially extending teeth 44 circumferentially disposed for driving engagement with a chain, or for another gear wheel. The gear member 42 rotates freely on the roller bearing 41 and is held against lateral displacement by plate 45, which is held in place against shoulders provided by the large portion 39 of the studs 38 by means of nuts 46. This plate also serves as a means for closing the casing and retaining the spur-gear 36 in proper position.

As so far described, it will be noted that the motor is capable of operative association with any machinery that may be driven by the gear member 42 at a relatively slow speed or at a higher speed by the shaft extension 22', which projects from the other end of the motor and which rotates at the same speed at which the armature is designed to be rotated.

When the power-transmission device just described is designed to be instrumental in transmitting the power from an electric motor to an internal combustion engine, I prefer to connect it as shown in Fig. 1, wherein a chain 47 connects the gear 42 of the motor with a driving gear 48 that is provided with an automatic clutch.

The wheel 48 has an annular part 51 having radially extending gear teeth 52 circumferentially spaced around the annulus for engagement with another gear wheel, or with the chain 47. Side plates 55 and 56 are secured to the annulus 51 by screws 57. The annulus 51 and the plates 55 and 56 are independently rotatable around the part 48' which latter is secured to the shaft 49, as by means of a key 58.

When the motor is driving the clutch member 51 in the direction shown by the arrows in Fig. 5, the rolling clutch members 54—54 will thereby be forced into the narrowest portion of the slots 53—53 and will firmly clutch together the part 48', which is fastened to the engine shaft, and the part 51, which is driven by the motor, thereby rotating the engine shaft 49 until the engine becomes self-propelling. When the engine becomes self-propelling it rotates the part 48' in the same direction in which it is being rotated by the motor, but at a higher speed than that at which the part 51 is being rotated and the rolling clutch members 54—54 will thereby be pressed or forced toward the wider portions of the slots 53—53 and cause disengagement of the parts 48' and 51, after which the electric circuit, in which the motor is included, may be opened and the motor will remain stationary while the engine may continue in operation.

There are many environments in which my transmission mechanism may be employed with equal advantage, but I have herein shown a single application of the device and its attendant advantages.

Having described my invention, what I claim is:

1. In a power transmitting mechanism a casing; a rotatable power member therein; a shaft projecting from said casing; a hollow hub concentric with said shaft and secured to the casing; a power driven member surrounding said hub; and speed reducing gearing connecting said shaft and said power driven member.

2. In a device of the character described, a rotatable shaft; an eccentric carried by said shaft; a floating perforate, spur-gear mounted on said eccentric; a hollow hub concentric with the axis of said shaft; an external driving, internally-geared member, rotatably mounted on said hub, having geared relation with said spur-gear and having a different number of teeth therefrom; studs taking into said hub and passing through perforations in said spur-gear to prevent the latter from rotating and a cover plate secured in place by said studs.

3. In a device of the character described, a rotatable part; an eccentric rotatable thereby; a spur-gear universally movable in its diametric plane by said eccentric; means to prevent rotation of said spur-gear; a driven, internally geared, member overlying said spur-gear in mesh therewith and having a different number of teeth therefrom; and a closure end plate for preventing axial movement of said driven member in one direction and providing therewith a housing for the connecting mechanism.

4. In a device of the character described, the combination of a casing; a hollow hub extending from one end of said casing; a shaft journaled therein and extending beyond the end of the said hub; an external driving, internally geared member rotatably mounted on said hub, one end abutting against the said casing, and the other end extending beyond the hub; speed reducing gearing connecting the said geared member with the said shaft, and a cover plate contacting with the outer end of the driving member to prevent axial movement thereof and secured to the said hub.

5. In a device of the character described, the combination of a casing; a hollow hub extending from one end thereof; a shaft journaled within the said hub and extending beyond the end of the hub; an external driving, internally geared member rotatably mounted upon the said hub, its inner end abutting against the wall of the casing and its other end extending beyond the end of the hub; speed reducing gearing positioned beyond the end of the hub and connecting the said shaft with the said external driving member, and a cover plate contacting with the outer end of the said driving member and secured to the said hub for preventing axial movement of the driving member and coacting therewith to completely inclose the speed reduction gearing.

6. The combination, of an electric motor having a primary rotatable member, an eccentric rotating therewith, a secondary rotatable member, an internal gear wheel secured to the secondary member, a spur gear wheel mounted on an eccentric and having teeth engaging the teeth of the internal gear wheel, means to prevent the rotation of the spur gear wheel while permitting gyration, an internal combustion engine having a crank shaft, and means connecting said secondary member with the crank shaft comprising a clutch which remains locked when the motor acts as the driver and automatically releases when the crank shaft becomes the driver.

7. The combination of an electric motor having a primary rotatable member, an eccentric rotating therewith, a secondary rotatable member, an internal gear wheel secured to the secondary member, a spur-gear wheel mounted on the eccentric and having teeth engaging with the teeth of the internal gear wheel, a plate having a floating movement without rotation, means to lock the floating plate to the spur-gear to provide for a floating movement of the latter, an internal combustion engine having a crank-shaft, and means connecting said secondary member with the crank-shaft comprising a clutch which remains locked when the motor acts as the driver and automatically releases when the crank-shaft becomes the driver.

In testimony whereof I hereunto set my hand in the presence of two witnesses.

VINCENT G. APPLE.

In the presence of—
  N. E. SNYDER,
  W. C. WEINMAN.